(12) United States Patent
Abdulzahra

(10) Patent No.: US 10,595,478 B2
(45) Date of Patent: Mar. 24, 2020

(54) PLANTING POT

(71) Applicant: Hazim Abdulzahra, Lake Elsinore, CA (US)

(72) Inventor: Hazim Abdulzahra, Lake Elsinore, CA (US)

( * ) Notice: Subject to any disclaimer, the term of this patent is extended or adjusted under 35 U.S.C. 154(b) by 0 days.

(21) Appl. No.: 15/997,480

(22) Filed: Jun. 4, 2018

(65) Prior Publication Data

US 2019/0053445 A1    Feb. 21, 2019

Related U.S. Application Data

(63) Continuation-in-part of application No. 15/682,447, filed on Aug. 21, 2017, now Pat. No. 9,986,695.

(51) Int. Cl.
*A01G 27/00* (2006.01)
*A01G 9/28* (2018.01)
(Continued)

(52) U.S. Cl.
CPC .............. *A01G 27/006* (2013.01); *A01G 9/02* (2013.01); *A01G 9/021* (2013.01); *A01G 9/28* (2018.02); *A01G 13/0243* (2013.01); *C08L 97/02* (2013.01)

(58) Field of Classification Search
CPC ........ A01G 27/006; A01G 27/02; A01G 9/02; A01G 9/0291; A01G 25/06;
(Continued)

(56) References Cited

U.S. PATENT DOCUMENTS 1,331,261 A    2/1920   Hornsby
3,469,341 A *  9/1969   Bourget ................... A01G 7/00
                                                         47/74

(Continued)

FOREIGN PATENT DOCUMENTS

DE    29715216    11/1997
DE    19700612    7/1998

OTHER PUBLICATIONS

Patent Cooperation Treaty, "Notification of Transmittal of the International Search Report and the Written Opinion of the International Searching Authority, or the Declaration," for PCT/US2017/048070, dated Oct. 27, 2017, 12 pages.

(Continued)

*Primary Examiner* — Kristen C Hayes
(74) *Attorney, Agent, or Firm* — Jeffrey G. Sheldon; Katherine B. Sales; Cislo & Thomas

(57) ABSTRACT

A planting pot comprising a biodegradable container comprising an open top portion and an open bottom portion, a planting medium for a plant located within the container, the planting medium comprising a top surface, an upper layer of material, a lower layer of material, and a middle layer of material disposed between the upper and lower layers of material, a hollow irrigation line comprising an upper portion above the top surface of the planting medium and a lower portion within the planting medium, at least a portion of the lower portion of the irrigation line comprising multiple openings to permit irrigation water to flow there through into the planting medium, a moisture sensor disposed within the planting medium, and a plant planted in the container.

8 Claims, 7 Drawing Sheets

(51) Int. Cl.
*A01G 9/02* (2018.01)
*A01G 13/02* (2006.01)
*C08L 97/02* (2006.01)

(58) Field of Classification Search
CPC ............... A01G 13/0212; A01G 9/022; A01G 13/0206; A01G 13/02; A01G 13/0243; A01G 13/04
See application file for complete search history.

(56) References Cited

U.S. PATENT DOCUMENTS

| | | |
|---|---|---|
| 3,706,160 A | 12/1972 | Deibert |
| 3,828,473 A | 8/1974 | Morey |
| 4,148,155 A | 4/1979 | Allen |
| 4,236,351 A | 12/1980 | Smith |
| 6,079,154 A * | 6/2000 | Farwell ................... A01G 9/02 47/41.11 |
| 6,944,989 B1 | 9/2005 | Bradley |
| 8,950,111 B2 * | 2/2015 | Soejima ................... A01G 7/02 435/292.1 |
| 10,098,288 B1 * | 10/2018 | Escobedo ............... A01G 9/124 |
| 10,123,926 B2 * | 11/2018 | Brewer ............... A61G 17/0073 |
| 2008/0092440 A1 * | 4/2008 | Johnson ............. A01G 13/0212 47/48.5 |
| 2009/0313893 A1 | 12/2009 | McIntyre |
| 2010/0122490 A1 | 5/2010 | Stewart et al. |
| 2011/0247269 A1 | 10/2011 | Cool et al. |
| 2014/0026475 A1 | 1/2014 | Centeno |
| 2014/0130406 A1 | 5/2014 | Burrowes |
| 2017/0188525 A1 * | 7/2017 | Paige, Sr. .......... A01G 13/0243 |
| 2018/0220604 A1 * | 8/2018 | Zemach ............. A01G 13/0237 |

OTHER PUBLICATIONS

United States Patent and Trademark Office, "Notice of Allowance and Fee(s) Due," dated Feb. 8, 2018 for U.S. Appl. No. 15/682,447, 46 pages.

* cited by examiner

PLANTING POT

CROSS-REFERENCE TO RELATED APPLICATIONS

This application is a continuation-in-part of U.S. patent application Ser. No. 15/682,447 titled "A Planting Pot," filed Aug. 21, 2017, the contents of which are incorporated herein by reference in their entirety.

BACKGROUND

There are many countries around the world, including parts of the United States, that are dealing with various climate issues that are having adverse effects on trees. Currently, there are 168 countries that are suffering from "Desertification", which essentially means that lands are turning into deserts. This devastating process is happening to about two-thirds of the world's grasslands, and accelerating climate change is causing social chaos in traditional grazing societies. This is a very serious problem.

Additionally, there's also the issue of being able to effectively conserve water. And places like the Middle East constantly deal with sand storms, which leave dirt and sand residue over trees and then more water is needed to cleanse the trees.

Typical irrigation systems involve arbitrarily spraying a large amount of water on the soil around the trees in order to insure an adequate amount actually reaches the roots below soil level. Drought-affected places cannot afford to waste water in this fashion. As a result, trees are either very expensive or not grown at all. Drip systems are also known, but they are still hard to gauge how much water is making its way down to the roots of the plants.

Accordingly, there is a need for an improved planting pot, and particularly trees, which reduces the amount of water needed to be expended on the trees in order for them to grow.

SUMMARY

In one embodiment, the present invention is directed to a planting pot comprising a) a biodegradable container comprising an open top portion and a closed bottom portion, the closed bottom portion having at least one drainage opening for drainage of water therefrom; b) a planting medium for a plant located within the container, the planting medium comprising a top surface, an upper layer of material, and a lower layer of material; c) an irrigation system comprising an irrigation line in fluid communication with at least two vertically oriented posts, the posts comprising an upper portion above the top surface of the planting medium and a lower portion within the planting medium, at least a portion of the lower portion of the posts being hollow and comprising multiple openings to permit irrigation water to flow there through into the planting medium; d) a plant planted in the container; and e) a shade supported by the upper portions of the posts for shading the plant.

The biodegradable container can be made from unfired clay. Optionally, the biodegradable container further comprises palm fiber mixed with the unfired clay, and the palm fiber comprises from about 10% to about 30% by volume of the mixture. The upper layer of material can be selected from the group consisting of topsoil and potting soil, and the lower layer of material is selected from the group consisting of hay, gravel, and sand. At least a portion of the container is disposed within the ground, and the planting pot can further comprise at least one moisture sensor disposed within the planting medium. Optionally, the shade can be made from polyethylene.

In a second embodiment, the present invention is directed to a planting pot comprising a) a container comprising an open top portion and a closed bottom portion, the bottom portion having at least one drainage opening for drainage of water therefrom; b) a planting medium for a plant located within the container, the planting medium comprising a top; c) an irrigation system comprising an irrigation line in fluid communication with at least two vertically oriented posts, the posts comprising an upper portion above the top of the planting medium and a lower portion within the planting medium, at least a portion of the lower portion of the posts being hollow and comprising multiple openings to permit irrigation water to flow there through into the planting medium; and d) a shade supported by the upper portions of the posts for shading a plant in the container. The container can be biodegradable.

Optionally, the top of each post is at least 6 inches above the top of the planting medium, and the bottom portion of the container is located below a ground surface. Optionally, the planting pot can further comprise a layer of silt disposed on at least a portion of an outside surface of the container.

In a third embodiment, the present invention is directed to a method of planting a tree comprising the steps of: a) grasping the planting pot; b) placing the planting pot within a ground surface; and c) before or after step b) planting a tree in the planting medium.

In a fourth embodiment, the present invention is directed to a planting pot disposed within a ground surface comprising: a) a container comprising an open top portion and a closed bottom portion, the closed bottom portion disposed below the ground surface; b) a planting medium for a plant located within the container, the planting medium comprising a top, an upper layer of material and a lower layer of material; c) an irrigation system comprising an irrigation line in fluid communication with at least two vertically oriented posts, the posts comprising an upper portion above the top of the planting medium and a lower portion within the planting medium, at least a portion of the lower portion of the posts being hollow and comprising multiple openings to permit irrigation water to flow there through into the planting medium; and d) a shade supported by the upper portion of the posts for shading a plant in the container. The container can be biodegradable.

In a fourth embodiment, the present invention is directed to a planting pot comprising a biodegradable container comprising an open top portion and an open bottom portion, a planting medium for a plant located within the container, the planting medium comprising a top surface, an upper layer of material, a lower layer of material, and a middle layer of material disposed between the upper and lower layers of material, a hollow irrigation line comprising an upper portion above the top surface of the planting medium and a lower portion within the planting medium, at least a portion of the lower portion of the irrigation line comprising multiple openings to permit irrigation water to flow there through into the planting medium, a moisture sensor disposed within the planting medium, and a plant planted in the container.

In a sixth embodiment, the present invention is directed to a system for growing a plurality of plants in a row, the system comprising a trench disposed within a ground surface, the trench having an open top proximate the ground surface, a closed bottom below the ground surface, two opposed sides and two opposed ends, two sheets of biodegradable material, one sheet disposed along each opposed side of the trench, each sheet having a bottom edge proximate to the bottom of the trench and a top edge proximate to the open top of the trench, wherein a distance between bottom edges of the sheets is less than a distance between the top edges of the sheets, and a planting medium for plants, the planting medium comprising a top surface, an upper layer of material, a lower layer of material, and a middle layer of material disposed between the upper and lower layers of material.

DRAWINGS

These and other features, aspects, and advantages of the present invention will become better understood with reference to the following description, appended claims, and accompanying drawings where:

DESCRIPTION

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

Figure 1:
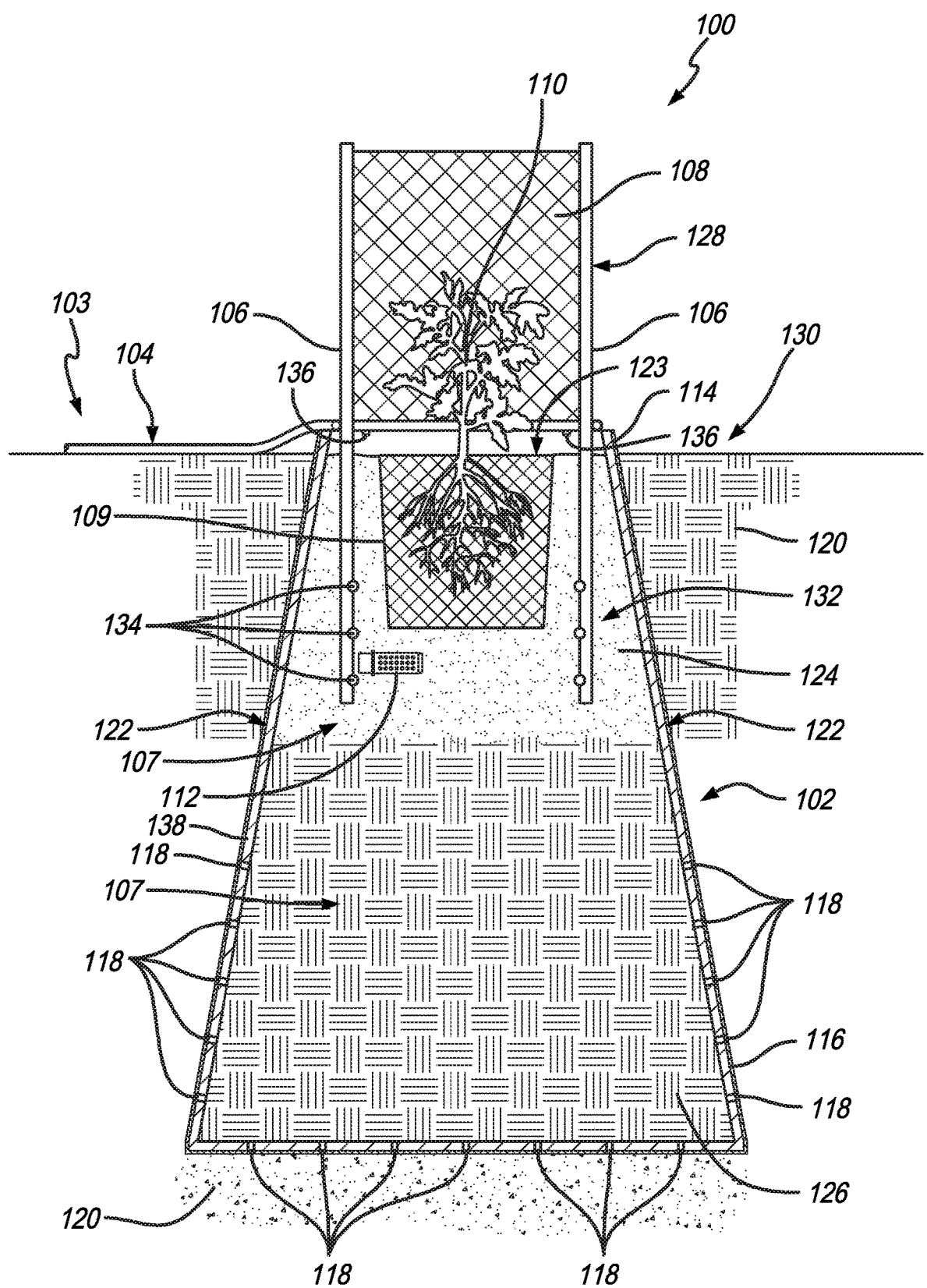
FIG. 1 is a vertical sectional view of a first planting pot having features of the present invention.

Referring now to FIG. 1, there is shown a planting pot 100 for growing plants. The planting pot 100 comprises a container 102, an irrigation system 103 comprising an irrigation line 104 in fluid communication with at least two vertically oriented posts 106, planting medium 107, and a shade 108. The planting pot 100 is designed to deliver water to a root zone 109 of a plant 110 planted in the container 102, while insulating the plant 110 from surface heat. It also shields young plants 110 from sun and wind. Optionally, moisture sensors 112 can be used to monitor moisture levels in the planting medium 107.

The plant 110 can be any type of plant, including but not limited to a shrub, a bush, a flowering plant, a vine, or a tree. The plant 110 can be fruit or non-fruit bearing, used for commercial or industrial purposes, or used strictly for decorative/landscaping purposes.

The container 102 has a top portion 114 and a bottom portion 116. The top portion 114 is open for receiving the plant 110 therein, and the bottom portion 116 is closed. At least a portion of the bottom portion 116 is placed below surrounding soil level 130 such that the sides and bottom of the container 102 are surrounded by surrounding soil 120.

The bottom portion 116 comprises a plurality of openings 118 to permit water to leave the container 102 and enter the surrounding soil 120. The container 102 can be made from biodegradable material. Preferably the container 102 is made from unfired clay, and most preferably the unfired clay is mixed with palm tree fibers. Optionally, the unfired clay is mixed with hay or straw, that is finely chopped, and preferably agriculture quality. The ideal concentration/amount of palm fibers in the mixture is about 15% to about 20% of the mixture by volume; however, the concentration can range from about 10% to about 30% of the mixture by volume. The mixture of clay and fibers provides strength and rigidity for placing the planting pot 100 in the ground, while maintaining the necessary fragility to break when the plants 110 roots grow large enough to burst out of the container 102 into the surrounding soil 120. Additionally, the fiber mixed with the clay creates a strong structure and can aid in the prevention of bacterial growth within the container 102. The clay can be baked in the sun and does not require any sort of oven. Baking it in the sun is much more cost efficient than utilizing a gas or electricity powered oven. Preferably, the clay particles used to make the container 102 comprise finely graded clay, where more than 50% of the particles pass through a no. 200 sieve. Optionally, the container 102 can comprise a 4 to 1 ratio of clay to sand. The sand utilized can be clean, washed, construction grade, where more than 50% of the sand particles pass through a no. 4 sieve.

The top portion 114 of the container 102 (approximately the upper 20% of the volume of the container 102) is typically narrower and has a smaller diameter than the bottom portion 116 of the container 102 (approximately the lower 20% of volume of the container 102). The bottom portion 116 of the container 102 can be from about 1 foot to about 2.5 feet in diameter, and the top portion 114 can be from about 6 inches to about 3 feet in diameter. The container 102 can be from about 3 to about 5 feet in height, and the walls 122 can be from about 0.25 inches to about 1 inch thick. Preferably the top portion 114 is approximately 1 foot in diameter, the bottom portion 116 is approximately 3 feet in diameter, and the walls 122 are about 0.5 inches thick. The walls 122 provide insulation and minimize moisture loss from evaporation and diffusion. The tapered shape of the container 102 is desired because the smaller diameter of the top portion 114 helps reduce the amount of moisture lost from the container 102. However, these dimensions can be scaled up or down as desired, depending on the application/expected size of the plant being grown therein.

Optionally, the container 102 can be constructed in three pieces. The container 102 can be split down the middle vertically to form a front half and a back half, and the lower portion 116 (or base) can also be a separate piece. Constructing the container 102 in three pieces provides ease of transport for the containers 102 to the locations where they are installed.

The container 102 can contain planting medium 107. Preferably, the planting medium 107 comprises a top surface 123, an upper layer of material 124 and a lower layer of material 126. The upper layer material 124 provides growth support to the plant 110 planted in the container 102, and can be selected from the follow materials: top soil (top soil is typically a rich layer of soil where most nutrients for plants are found), top soil mixed with animal waste to act as a fertilizer, potting soil (potting soil is typically a mixture of loam, peat, sand, and nutrients, used as a growing medium for plants in containers), and other materials having the same type of properties with regard to growing plants. The selection of the upper layer of material 124 entirely depends on the type of plant 110 planted therein. The lower layer of material 126 is configured and sufficiently porous to facilitate drainage of water from inside the container 102 to the surrounding soil 120. The lower layer of material 126 can be selected from the follow materials: sand, hay, gravel, and other materials having the same type of properties with regard to facilitating drainage of water. In the event there is rain or flooding, and the upper layer of material 124 is saturated with water, any excess water must be able to leave the container 102.

Additionally, silt 138 comprised of dirt, soil or clay mixed with water, can be disposed around an entire outside surface of the container 102, as shown in FIG. 1. The dirt, soil or clay that is used to form the silt 138 is made of fine particles, where more than 50% of the particles pass through a no. 200 sieve, such that a mud or slurry can be formed. Optionally, the silt 138 can be disposed around approximately the top 40% of the outside surface of the container 102. The silt 138 can be installed when the container 102 is created. The purpose of the silt 138 is to act as insulation to protect the planting medium 107 inside the container 102 from moisture loss. The first two feet from the top surface 123 of planting medium 107 is vulnerable to heat retention from the sun, especially in areas that are consistently above 95 degrees. The silt 138 helps insulate these first two feet of material 124 within the container. Additionally, moisture loss also happens at night. Again, the insulating silt 138 helps prevent too much moisture from leaving the planting medium 107. The silt 138 can be painted or sprayed onto the outside surface of the container 102, and typically is applied in a layer approximately 0.25 inches to about 1 inch thick. The layer of silt 138 need not be uniform in thickness.

Figure 3:
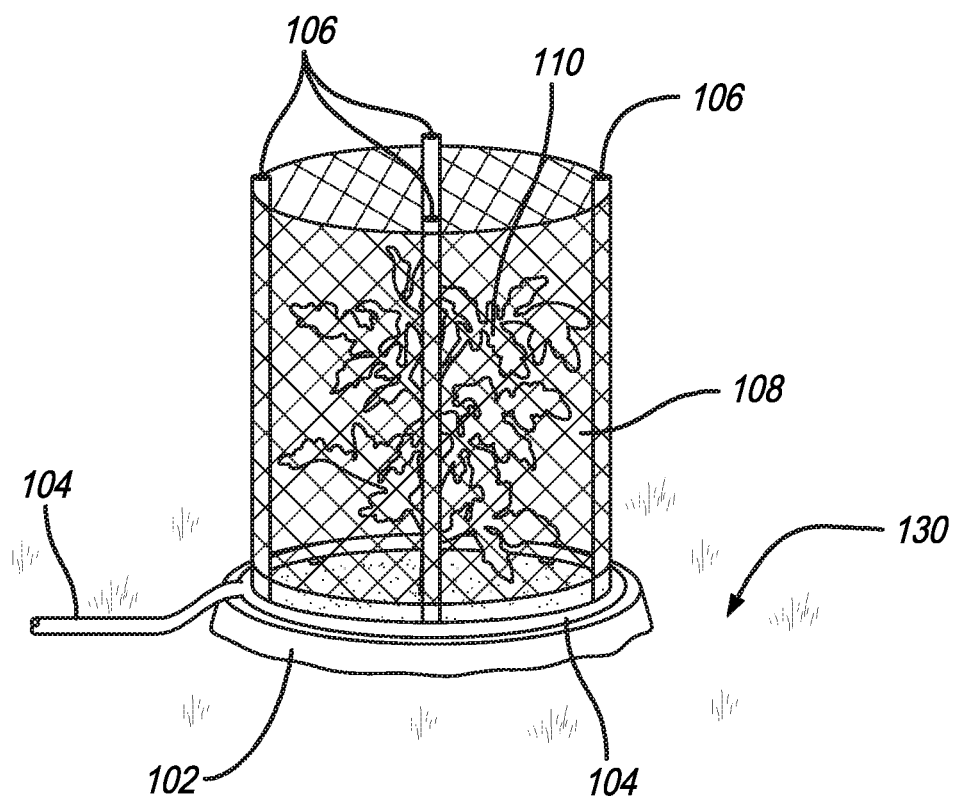
FIG. 3 is a perspective view of the top part of the planting pot of FIG. 1.

The irrigation line 104 is configured to deliver water to the planting pot 100 and facilitate growth of the plant 110 planted within the container 102. The irrigation line 104 can be made from polyvinyl chloride (PVC), plastic, or metal, and is coupled to the water source, such as irrigation pumps, utilized the grower. The irrigation line 104 is typically from about 0.25 inches to about 1 inch in inside diameter and can has a pressure rating from about 0 to about 60 PSI. The irrigation line 104 is in fluid communication with the vertically oriented posts 106, as best shown in FIG. 3. There is an opening in the irrigation line 104 that aligns with an opening in the vertically oriented posts 106 such that water can pass from the irrigation line 104 into the vertically oriented posts 106. Optionally, the irrigation line 104 can also have one or more drippers 136 coupled to the line 104 to provide drip irrigation as well. The irrigation line 104 can comprise more than one irrigation line 104.

The posts 106 are in fluid communication with the irrigation line 104, as noted above. The posts 106 extend vertically upward, away from the top 123 of the planting medium 107, and have an upper portion 128 above the top surface 123 of the planting medium 107 and a lower portion 132 within the planting medium 107. Typically, the upper portion 128 extends approximately 2 to 4 feet above the top 123 of the planting medium 107, and the lower portion 132 extends approximately 1 to 2 feet down into the planting medium 107, making the posts 106 approximately 3 to 6 feet long. The posts 106 can be made from bamboo poles, plastic, PVC, metal or wood, and at least the lower portion 132 has a hollow portion to allow water to travel therethrough and into the planting medium 107. Preferably the posts 106 are made from hollow bamboo poles so that they are biodegradable.

The lower portion 132 of the posts 106 comprise multiple openings 134 to permit water to leave the posts 106 and enter the planting medium 107 contained in the container 102. The openings 134 can be any size, but typically are about 0.5 inches in inside diameter. Because the posts 106 deliver water down into the planting medium 107 close to the roots of the plant 110, they contribute to preventing water from evaporating to surrounding air, particularly in hot, arid climates. This reduces the amount of water needed to irrigate the plant 110. There are at least two posts 106, and preferably there are four posts 106, as best shown in FIG. 3. The posts 106 can be in close proximity to the plant 110 and surround the plant 110 in a circle. This configuration contributes to creating shade around the plant 110 and helps protect against strong, damaging winds. Additionally, if the plant 110 is a tree, preferably the posts 106 are at least two feet apart from each other. If the posts 106 are less than 2 feet apart, the surrounding shade 108 may start to restrict outward branching of the tree 110.

The shade 108 is supported by the upper portions 128 of the posts 106 and can be made from plastic, polyethylene, burlap, and natural fibers. Preferably the shade 108 is made from natural fibers/materials available in the location where the planting pot 100 is being used. The shade 108 is advantageous because it provides shade and reduces the amount of sunlight and wind that can reach and damage the growing plant 110. In some areas, direct sunlight provides too much heat and strong winds can severely damage young plants 110. Accordingly, as shown in FIG. 3, the shade 108 can be coupled to four posts 106 and encircle the growing plant 110 on all sides, leaving an open top such that some sunlight can still reach the plant 110.

The moisture sensor 112 can be disposed within the planting medium 107, proximate the root zone 109 of the plant 110. The moisture sensor 112 provides an alarm that notifies the user if the moisture content of the planting medium 107 inside the container 102 is too high or too low. The moisture sensor 112 can be wireless and send a signal to a program that specifies how much water each kind of tree or plant 110 is to receive based on need, weather, and type of plant, among other things. Optionally the moisture sensor 112 could be wirelessly connected to an application on a smart phone to notify the grower if the moisture content of the planting medium 107 inside the container 102 is too high or too low. Optionally, the moisture sensor 112 can be wirelessly or wire connected to a computerized program that oversees and regulates the watering process. The computer program can be programmed by the grower to provide the necessary amount of water based upon signals received from the moisture sensor 112. Each moisture sensor 112 can control approximately twenty plants or trees 110 (one type of plant or tree per twenty depending on type of tree, location, purpose (i.e. fruit bearing vs. not fruit bearing), and weather). This provides more control over and increase efficiency of the watering process.

There can be more than one sensor 112 in the same area in order to detect a moisture sensor 112 failure. Sensors in general can fail or degrade over time, depending on the type of sensor and the environment to which it is exposed, especially if the moisture sensors 112 are located in an extreme desert environment. Accordingly, if the planting pot 100 has three (3) soil moisture sensors 112 in the same area, and one of them is giving a reading very different from the other two, then the moisture sensor 112 may have failed or become disconnected and could alert the grower to the problem.

Alternatively, the moisture sensor 112 can be located on top of the planting medium 107. Modern residential sprinkler controllers are equipped with weather stations and can automatically adjust watering based on temperature, rain, amount of sun exposure (based on latitude), and type of plant in each zone, and such a system could be utilized here.

In the event that this planting pot 100 is being used in a desert where electricity can be hard to access, solar panels could be used to generate the power needed to run the moisture sensors 112 and/or water pump and/or irrigation system. Additionally, if the moisture sensors 112 and irrigation pumps run off of solar power, it can be necessary to have rechargeable batteries in addition to solar panels. When the irrigation pumps are running, they may require more power than the solar panels can produce, especially if the pumps try to run when a cloud is blocking the sunlight. In that instance, energy stored the batteries can be utilized.

Figure 2:
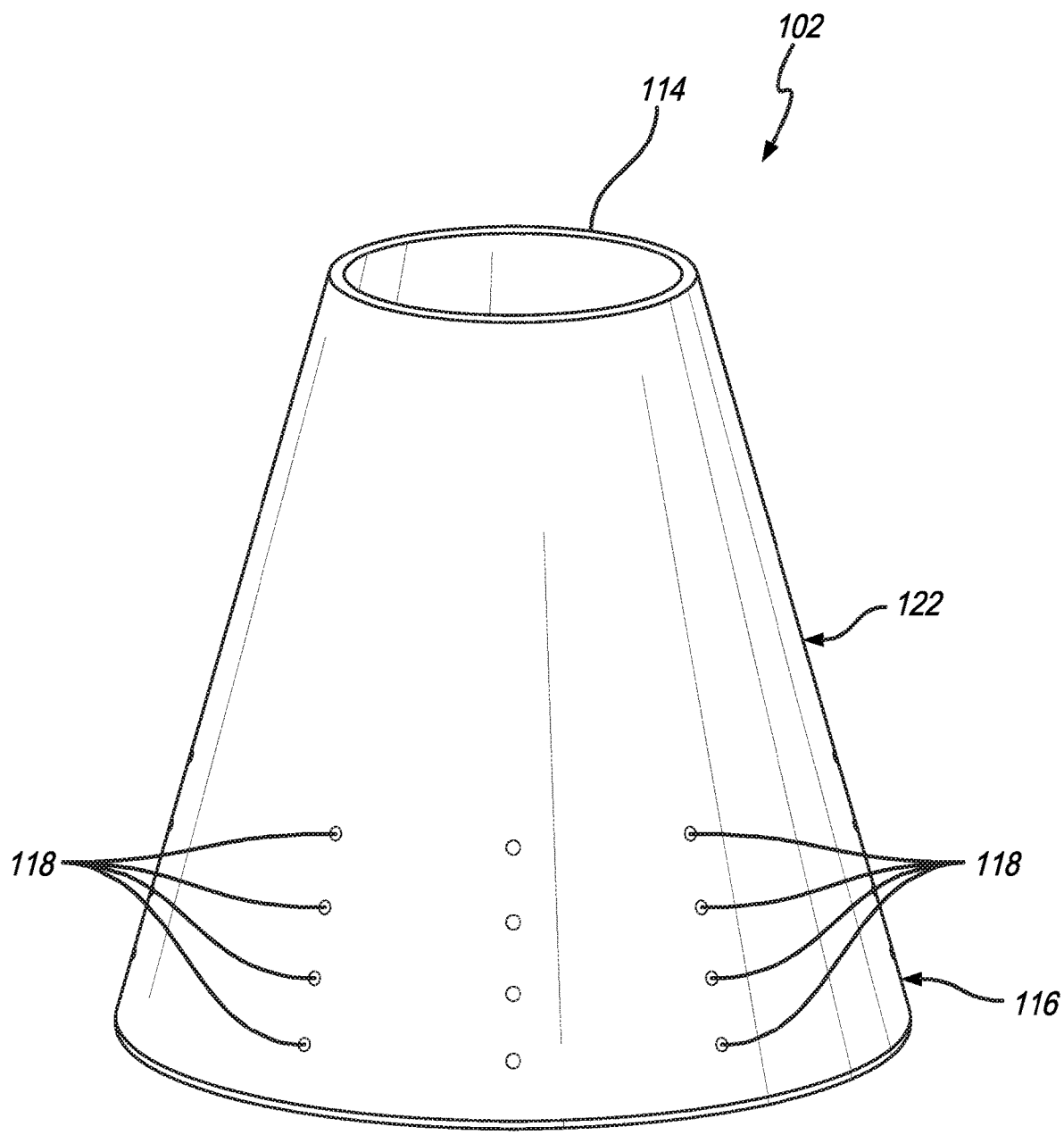
FIG. 2 is a perspective view of a container according to the planting pot of FIG. 1.

A method of planting a plant is shown in FIGS. 1-3. The method comprises the steps of: a) grasping the planting pot 100; b) placing the planting pot 100 within a ground surface 130; and c) before or after step b) planting a tree in the planting medium 107. Optionally, the container 102 can be placed in the ground surface 130 first, and then the planting medium 107 can be placed inside the container 102. After planting medium 107 is placed inside the container 102, the tree 110 can be planted in the container 102. Next, the posts 106 can be placed around the tree 110 and coupled to the irrigation line 104, and finally, the shade 108 can be coupled to the posts 106. Optionally, before or after placing the planting medium 107 in the container 102, the sensor 112 can be placed in the planting medium 107.

Figure 4:
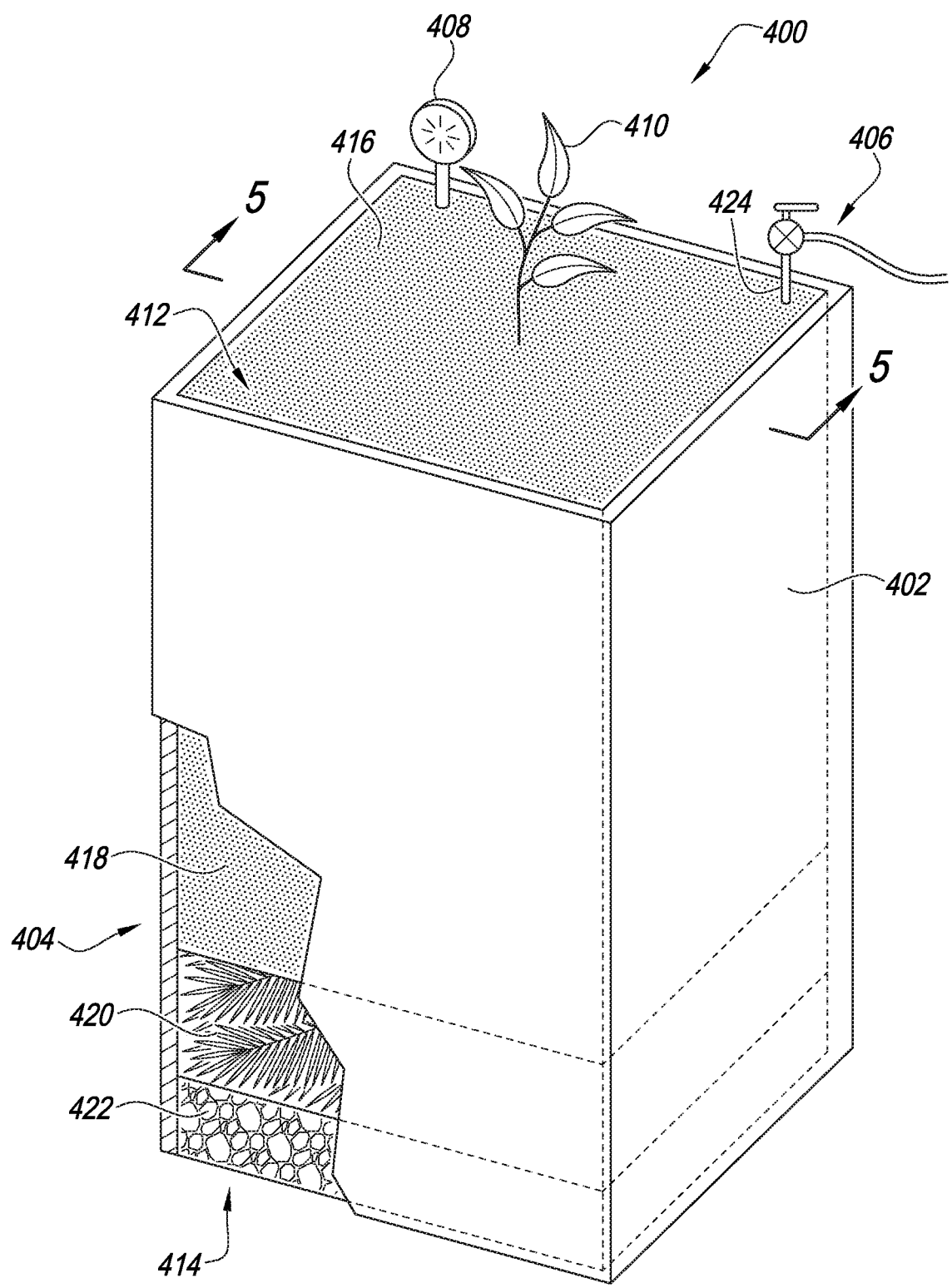
FIG. 4 is a perspective view of a second planting pot having features of the present invention.
Figure 5:
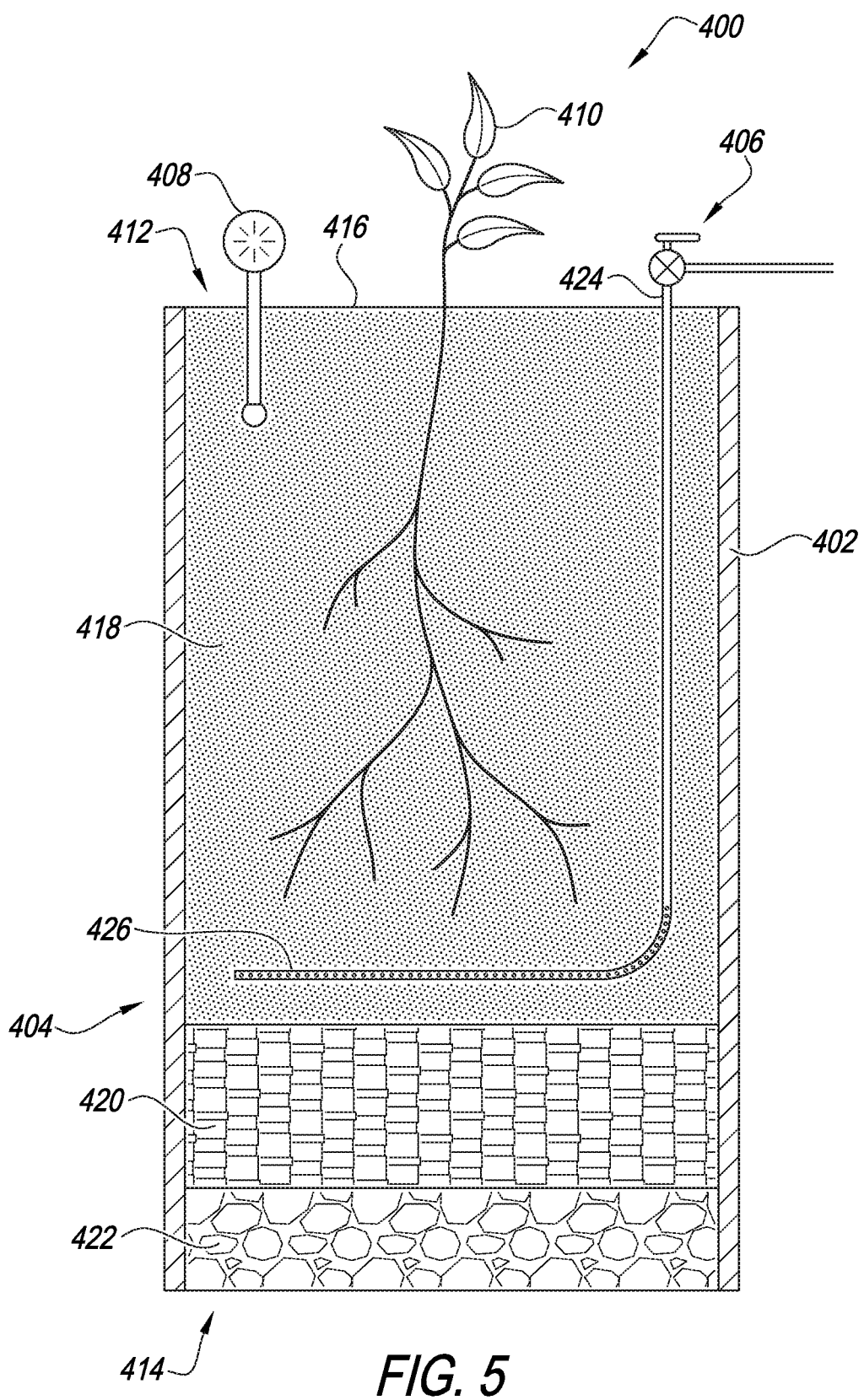
FIG. 5 is a vertical sectional view of the second planting pot of FIG. 4, taken along line 2-2.

Referring now to FIGS. 4 and 5, there is shown a planting pot 400 for growing plants 410. The planting pot 400 comprises a biodegradable container 402, a planting medium 404 contained therein, a hollow irrigation line 406, a moisture sensor 408, and optionally a plant 410 planted in the container 402.

The biodegradable container 402 comprises an open top portion 412 and optionally an open bottom portion 414. The biodegradable container 402 can be made from four sheets 415 of clay assembled into a box with an open top and an open bottom. Preferably the sheets 415 of clay are approximately 24 inches tall, 14 inches wide, and 0.5 to 1 inch thick. The dimensions of the sheets 415 can be scaled up or down depending on the application. Typically, natural clay that does not have any additives is used to make the sheets 415. The sheets 415 are made by taking natural clay (typically removed from the ground nearby) and drying it. Once dried, the dried clay forms clay sand. The clay sand is then reconstituted back into malleable clay by adding water and mixing the clay sand and water mixture with a high powered mixer. Typically, the ratio is 2 parts clay sand to 1 part water. Once reconstituted, the sheets 415 are formed—either by hand rolling or formed using frames. Once formed, the sheets 415 are then high-fired at a controlled cone 4 firing for 4 hours. Once fired, the sheets 415 are then slow cooled to ambient room temperature. Optionally, the clay can be baked in the sun. The use of clay without any additives, and the cone 4 firing, is desirable because at some point the sheets 415 will dissolve and get absorbed back into the earth. Additionally, in the event the plants roots contained therein outgrow the container 402, the roots are able to break through the clay sheets 415. If the clay had additives, or the sheets 415 were fired for a longer period of time, the sheets 415 would not breakdown and biodegrade and would not permit the roots to break out if needed.

Preferably, the clay particles used to make the container 402 comprise finely graded clay, where more than 50% of the particles pass through a no. 200 sieve. Optionally, the container 402 can comprise a 4 to 1 ratio of clay to sand. The sand utilized can be clean, washed, construction grade, where more than 50% of the sand particles pass through a no. 4 sieve.

The planting medium 404 for a plant 410 is located within the container 402. The planting medium 404 comprises a top surface 416, an upper layer of material 418, a middle layer of material 420, and a lower layer of material 420. The middle layer of material 420 is disposed between the upper 418 and lower 422 layers of material. Optionally, but less preferably, additional layers of material can be disposed between the upper, middle and lower layers of material, 418, 420, 422, additional layers of material can be disposed above the upper layer of material 418, and additional layers of material can be disposed below the lower layer of material 422. This application is just dealing with the upper, middle and lower layers of material 418, 420, 422 in their relative positions.

The upper layer of material 418 preferably is topsoil, potting soil, sand, soil, organic materials, and combinations thereof. It should be noted that the specific composition of the upper layer of material 418 will vary depending on the plant being grown therein. The middle layer of material 420 preferably is cellulose fiber material, which can be obtained from the bark, wood or leaves of plants, or from a plant-based material. The middle layer of material 418 functions as a sponge, holding water for the plant 410 to use as needed. Preferably, the middle layer of material 420 is palm fronds and is between 2 and 3 inches thick. The lower layer of material 422 is preferably sand, hay, gravel, tree bark or wood chips, and combinations thereof, and other materials having the same type of properties with regard to facilitating drainage of water. Preferably the lower layer of material 422 is about 4 inches thick. In the event there is rain or flooding, and the upper layer of material 418 and the middle layer of material 420 are saturated with water, any excess water must be able to leave the container 402. An example of an acceptable lower layer of material 422 is date palm wood chips due to their purported antibacterial properties.

The hollow irrigation line 406 is configured to deliver water to the planting pot 400 and facilitate growth of the plant 410 planted within the container 402. The irrigation line 406 can be made from polyvinyl chloride (PVC), plastic, or metal, and is coupled to the water source, such as irrigation pumps, utilized the grower. The irrigation line 406 is typically from about 0.25 inches to about 1 inch in inside diameter and can have a pressure rating from about 0 to about 60 PSI.

There can be more than one irrigation line 406. The irrigation line 406 comprises an upper portion 424 above the top surface 416 of the planting medium 404 and a lower portion 426 within the planting medium 404. As best seen in FIG. 5, at least a portion of the lower portion 426 of the irrigation line 406 comprises multiple openings to permit irrigation water to flow there through into the planting medium 404. Preferably about 2 feet of the lower portion 426 of the irrigation line 406 is perforated.

The moisture sensor 408 (as discussed above with respect to other embodiments) is disposed within the planting medium 404.

A method of planting a plant 410 comprising the steps of: a) grasping the planting pot 402; b) placing the planting pot 402 within a ground surface 428; and c) before or after step b) planting a plant 410 in the planting medium 404.

Figure 6:
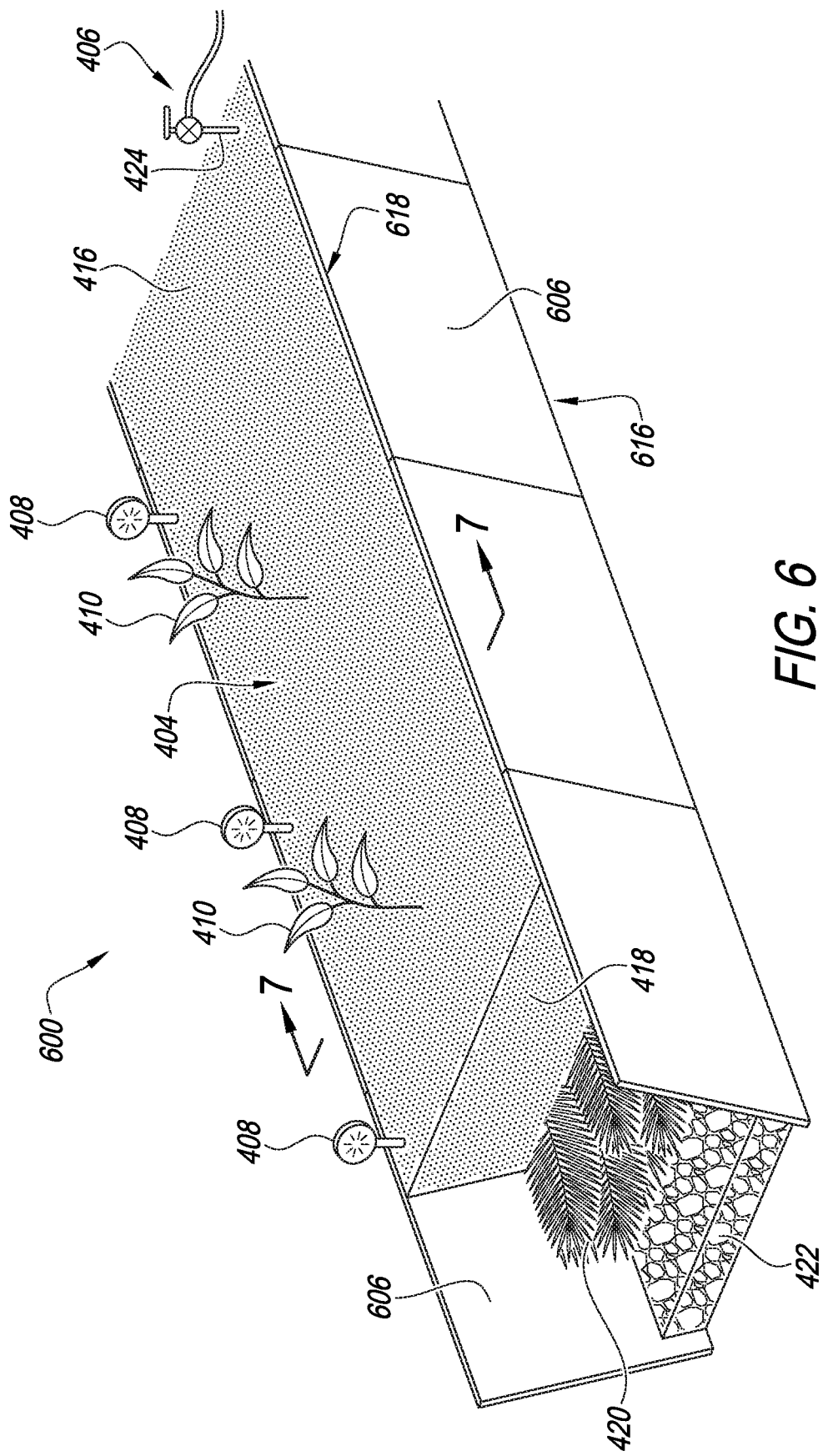
FIG. 6 is a perspective view of a system for growing a plurality of plants in a row having features of the present invention.
Figure 7:
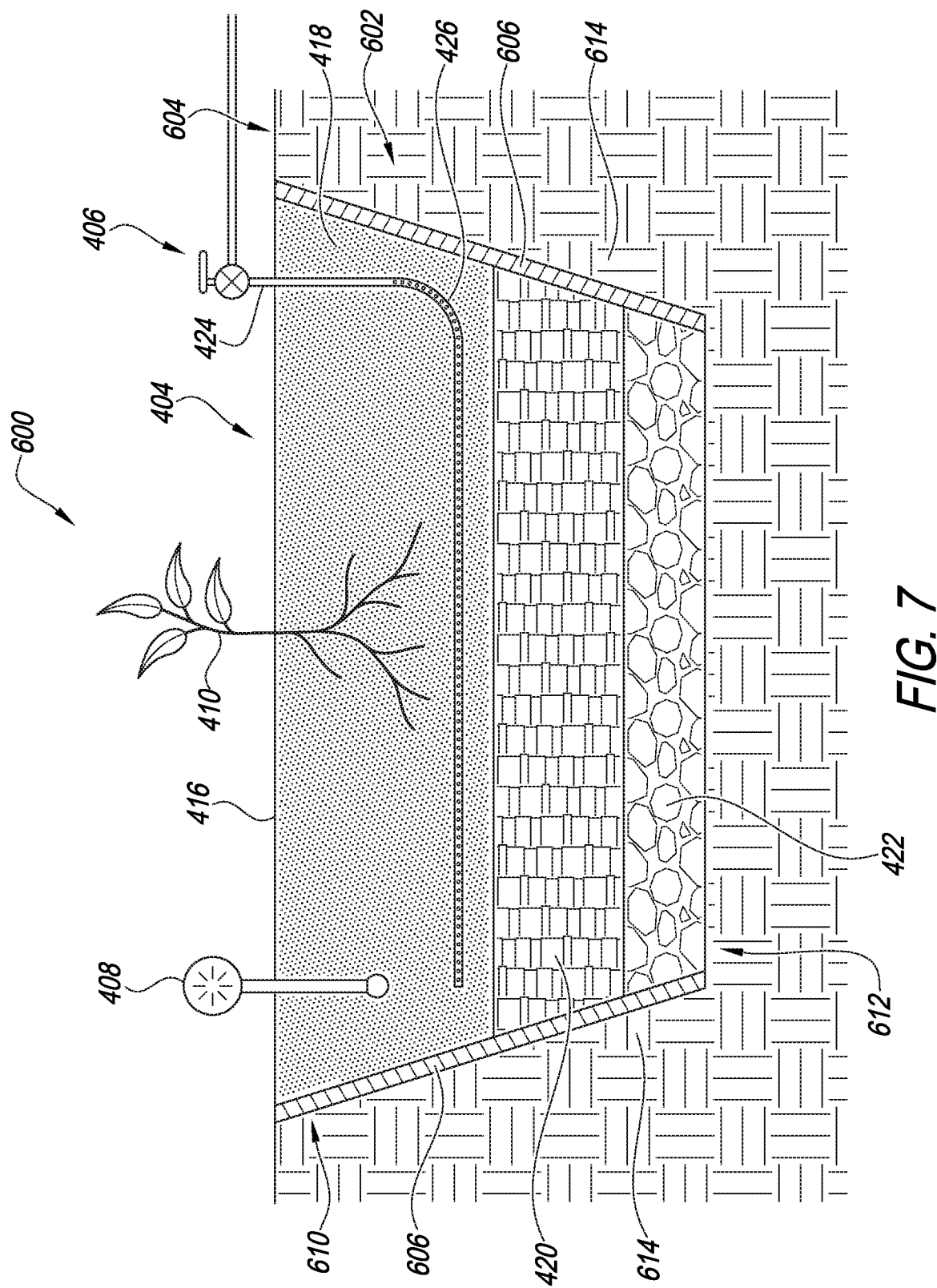
FIG. 7 is a vertical sectional view of the system of FIG. 6, taken along line 7-7.

Referring now to FIGS. 6 and 7, there is shown a system 600 for growing a plurality of plants 410 in a row. The system 600 comprises a trench 602 disposed within a ground surface 604, at least two sheets of biodegradable material 606, and a planting medium for plants 404.

The trench 602 has an open top 610 flush with the ground surface 604, a closed bottom 612 below the ground surface 604, two opposed sides 614 and two opposed ends (not shown). Typical dimensions of the trench 602 are 28 inches wide at the top 610, 20 inches wide at the bottom 612, and about 300 feet in length. These dimensions can vary depending on the crops being planted.

The at least two sheets of biodegradable material 606 are located within the trench 602. At least one sheet 606 is disposed along one side 614 of the trench 602, and at least one other sheet 606 is disposed along the opposed side 614 of the trench 602. Each sheet is approximately 1 inch thick, 14 inches tall, and 24 inches long. Optionally, a plurality of sheets 606 are laid end to end to so that they form a single long sheet running the length of the trench 602 on each side 614. Each sheet 606 has a bottom edge 616 proximate the bottom 612 of trench 602 and a top edge 618 proximate the open top 610 of the trench 602, wherein the distance between bottom edges 616 of the sheets 606 (about 20 inches) is less than the distance between the top edges 618 of the sheets 606 (about 28 inches). In this way, the sheets 606 are angled slightly outward, from bottom to top, creating an open top portion that is wider than an open bottom portion.

Regarding the planting medium 404, irrigation line 406, and moisture sensor 408, when the same reference numbers are used in different embodiments of the invention, they are substantially the same/similar.

More than one irrigation line 406 can be spaced along the trench 602 to ensure adequate water delivery to all plants 410 planted in the planting medium 404.

More than one moisture sensor 408 can be spaced along the trench 602 as well.

A method of planting a plurality of plants 410 in a row comprising the steps of: a) digging the trench 602; b) grasping the two sheets of biodegradable material 606; c) placing the two sheets of biodegradable material 606 within the trench 602, one sheet 606 disposed along each opposed side 614 of the trench 602; d) placing planting medium 404 between the two sheets 606; and e) after step d) planting a plurality of plants 410 in a row in the planting medium 404.

The invention has the following advantages:

1. The system minimizes the amount of resources needed by precisely applying water and nutrients directly to the root zone of the plants.

2. Because the planting medium is used only in the root zone, the planting medium can be rid of pathogens and pests prior to planting, and is more effective at supporting plant growth than the surrounding soil.

3. Water is applied based upon precise measurement of soil water status, thus maximizing plant productivity will using no more water than necessary.

4. The system confines plant roots to the area of greatest productivity, but also allows for leaching of salts. The need for leaching varies with water quality, but leaching is essential in arid regions (e.g. California) where water has sufficient salts to damage crops if not allowed to drain out of the root system.

5. The basic components of the system—the clay lining and the plant fiber bottom—are all natural and can be disposed of on site. However, the system is designed to last for years when high quality drip tape and period replacement of planting medium are used.

Although the invention has been described in terms of a preferred embodiment, nevertheless, changes and modifications can be made which do not depart from the spirit, scope and teachings of the invention. Such changes and modifications are deemed to fall within the purview of the present invention as claimed.

What is claimed is:

1. A planting pot comprising:
  a) a biodegradable container comprising an open top portion and an open bottom portion;
  b) a planting medium for a plant located within the container, the planting medium comprising a top surface, an upper layer of material, a lower layer of material, and a middle layer of material disposed between the upper and lower layers of material;
  c) a hollow irrigation line comprising an upper portion above the top surface of the planting medium and a lower portion within the planting medium, at least a portion of the lower portion of the irrigation line comprising multiple openings to permit irrigation water to flow there through into the planting medium;
  d) a moisture sensor disposed within the planting medium; and
  e) a plant planted in the container.

2. The planting pot of claim 1, wherein the biodegradable container is made from clay.

3. The planting pot of claim 1, wherein the upper layer of material is selected from the group consisting of topsoil, potting soil, sand, organic materials, and combinations thereof, the middle layer of material is palm fronds and the lower layer of material is tree bark.

4. The planting pot of claim 1, wherein at least a portion of the container is disposed within the ground.

5. A planting pot comprising:
  a) a container comprising an open top portion;
  b) a planting medium for a plant located within the container, the planting medium comprising an upper layer of material, a lower layer of material and a middle layer of material disposed between the upper and lower layers of material; and
  c) a hollow irrigation line comprising an upper portion above the top surface of the planting medium and a lower portion within the planting medium, at least a portion of the lower portion of the irrigation line comprising multiple openings to permit irrigation water to flow there through into the planting medium;
  wherein the upper layer of material is selected from the group consisting of topsoil, potting soil, sand, organic materials, and combinations thereof, the middle layer of material is palm fronds, and the lower layer of material is tree bark.

6. The planting pot of claim 5, further comprising at least one moisture sensor disposed within the planting medium.

7. The planting pot of claim 5, wherein the container is biodegradable.

8. The planting pot of claim 5, wherein the bottom portion of the container is located below a ground surface.

* * * * *